United States Patent
Miller et al.

(10) Patent No.: US 7,815,954 B2
(45) Date of Patent: Oct. 19, 2010

(54) FROZEN CONFECTION DISPENSER AND ASSOCIATED METHODS

(75) Inventors: Eric R. Miller, Deland, FL (US); William Brown, Orlando, FL (US)

(73) Assignee: Archibald Brothers International, Inc., Deland, FL (US)

( * ) Notice: Subject to any disclaimer, the term of this patent is extended or adjusted under 35 U.S.C. 154(b) by 1278 days.

(21) Appl. No.: 11/228,727

(22) Filed: Sep. 16, 2005

(65) Prior Publication Data

US 2006/0013941 A1 Jan. 19, 2006

Related U.S. Application Data

(62) Division of application No. 10/234,053, filed on Sep. 3, 2002, now abandoned.

(60) Provisional application No. 60/334,833, filed on Nov. 15, 2001.

(51) Int. Cl.
*B65D 81/34* (2006.01)
(52) U.S. Cl. ........................ 426/394; 426/389; 426/393; 426/515; 222/95
(58) Field of Classification Search .................. 222/94, 222/95, 105, 146.6, 309, 251, 253, 181.1, 222/185.1, 406, 249; 426/565, 115, 112, 426/106, 524, 393, 394, 389, 515; 62/250, 62/228.2, 440, 344
See application file for complete search history.

(56) References Cited

U.S. PATENT DOCUMENTS

| | | | |
|---|---|---|---|
| 2,558,887 A | | 7/1951 | Tesiero |
| 2,559,840 A | | 7/1951 | Arthur |
| 3,104,031 A | | 9/1963 | Wagner |
| 4,022,031 A | * | 5/1977 | Calim .......................... 62/66 |
| 4,155,304 A | | 5/1979 | Schweisser et al. |
| 4,452,823 A | * | 6/1984 | Connolly et al. ............ 426/115 |

(Continued)

FOREIGN PATENT DOCUMENTS

GB 2289253 11/1995

(Continued)

OTHER PUBLICATIONS

JP361187754 abstract.*

*Primary Examiner*—Drew E Becker
*Assistant Examiner*—Preston Smith
(74) *Attorney, Agent, or Firm*—Allen Dyer Doppelt Milbrath & Gilchrist (57) ABSTRACT

A dispenser for a soft-serve food product includes a housing having a dispensing chute and a piston having a head positioned therewithin. A lateral wall, the piston head, and a front door define an enclosed hollow space. The head is slidable within the lateral wall for squeezing a deformable container to dispense product through the chute. A system for preparing and dispensing a soft-serve food product includes a tempering freezer for raising a temperature of the food product from hard-frozen to a condition for soft-serve dispensing. An apparatus for packaging a soft-serve confection into a multiple-serving-size container for transport includes a blender for blending ingredients together to form a blended product and a device for transferring the blended product into a deformable container. The deformable container filled with the blended product is transferred into a substantially rigid mold and frozen to a hardened state for transport and retention.

3 Claims, 6 Drawing Sheets

U.S. PATENT DOCUMENTS

| | | | |
|---|---|---|---|
| 4,775,564 A | 10/1988 | Shriver et al. | |
| 5,069,364 A | 12/1991 | McGill | |
| 5,150,820 A | 9/1992 | McGill | |
| 5,215,222 A | 6/1993 | McGill | |
| 5,244,277 A | 9/1993 | Broussalian et al. | |
| 5,265,764 A | 11/1993 | Rowe et al. | |
| 5,328,710 A | 7/1994 | Malone et al. | |
| 5,405,054 A * | 4/1995 | Thomas | 222/95 |
| 5,407,093 A | 4/1995 | McGill | |
| 5,421,484 A * | 6/1995 | Beach | 222/95 |
| 5,429,273 A | 7/1995 | King et al. | |
| 5,463,878 A | 11/1995 | Parekh et al. | |
| 5,492,249 A | 2/1996 | Beach | |
| 5,505,336 A * | 4/1996 | Montgomery et al. | 222/82 |
| 5,620,115 A | 4/1997 | McGill | |
| 5,632,415 A | 5/1997 | McGill | |
| 5,749,240 A | 5/1998 | McGill | |
| 5,775,533 A | 7/1998 | Schroeder | |
| 5,893,485 A | 4/1999 | McGill | |
| 5,918,767 A | 7/1999 | McGill | |
| 6,105,820 A | 8/2000 | McGill | |
| 6,264,066 B1 | 7/2001 | Vincent et al. | |
| 6,299,025 B1 * | 10/2001 | Watanabe et al. | 222/146.6 |
| 6,378,740 B1 | 4/2002 | Martin | |
| 6,551,646 B1 | 4/2003 | Baker | |

FOREIGN PATENT DOCUMENTS

JP            361187754 A  *  8/1986

* cited by examiner

FROZEN CONFECTION DISPENSER AND ASSOCIATED METHODS

CROSS-REFERENCE TO RELATED APPLICATION

This application is a divisional of application Ser. No. 10/234,053, filed Sep. 3, 2002 now abandoned, which claims priority to provisional application 60/334,833, "Frozen Confection Dispenser and Associated Methods," filed on Nov. 15, 2001, both of which are commonly owned with the present invention and which are incorporated herein by reference.

BACKGROUND OF THE INVENTION

1. Field of the Invention

The present invention relates generally to the packaging, storing, and dispensing of frozen products such as soft ice cream, frozen custards, sorbets, other nondairy products, and the like, and more particularly to an efficient and cost-effective dispenser and method of packaging, storing, and dispensing a soft-serve ice-cream- or sorbet-style confection.

2. Description of Related Art

Soft-serve confection dispensing systems are used to provide consumers with desserts that are typically a mixture of previously stored ingredients that must be combined, mixed, and frozen in situ. Such machines are available for use, for example, in fast-food-styled restaurants, but such machines are typically expensive, require highly trained personnel to operate, need frequent cleaning, and break down with a greater than acceptable frequency.

Machines are known in the art that dispense frozen product either with the use of a screw extruder utilizing a conical screw or with a high-speed spinner mixer. As an example, Crossley (U.S. Pat. No. 5,743,640) teaches an apparatus that imparts a twist to dispensed ice cream. The mechanism of twisting the ice cream from the holding container includes a blending rod and a disk dividing injected ice cream into two mixing chambers.

Seymour (U.S. Pat. No. 4,881,663) discloses an apparatus for dispensing syrups for producing variegated soft ice cream. Ney (U.S. Pat. Nos. 4,668,561 and 4,861,255) discloses an apparatus that combines a drive motor, piston and shaft, and a rack and pinion device to extrude mixed product. A cooperation of concentric grooves and spokes drives product into an exit orifice, as well as a conventional manually operated actuating lever. Ohgushi et al. (U.S. Pat. No. 4,669,275) teach a "pressing-out mechanism" mediated by the handle and rotating axle. Kibby (U.S. Pat. No. 4,647,214) discloses the use of an auger to advance product toward a discharge opening.

Another frozen dessert dispensing apparatus is disclosed by Alpers et al. (U.S. Pat. No. 5,464,120), in which frozen product is dispensed downward through the action of a piston.

SUMMARY OF THE INVENTION

The present invention provides a dispenser for soft-serve confection and a method of use, wherein the dispenser and method avoid in situ manufacturing of product and do not require sophisticated personnel to operate. The dispenser is less susceptible to microbial contamination, is less expensive to own and operate, and dispenses a plurality of servings from a prefilled serving package.

The present invention also provides a system for dispensing a soft-serve confection, as well as an apparatus and method for preparing a soft-serve confection for dispensing.

In addition, a method of doing business is provided, wherein the business includes food product distribution and customer service.

A first aspect of the present invention is thus a dispenser for dispensing for a soft-serve food product from a deformable container having an opening. The dispenser comprises a housing comprising an inner lateral wall having a front edge defining a front opening and a front door movably affixed to the housing and movable between an open position exposing the front opening and a closed position obscuring the front opening. The door comprises a dispensing chute.

The dispenser also includes a piston having a head positioned within the housing. The lateral wall, the piston head, and the front door in a closed position define an enclosed hollow space. The head is slidable within the lateral wall from a rear position wherein the hollow space comprises a maximum volume dimensioned sufficiently large to receive the deformable container in a filled state to a front position wherein the space comprises a minimum volume dimensioned for squeezing the deformable container to a substantially empty state.

A dispensing spout has a passage therethrough and is engagable with the deformable container opening, and is further positionable in fluid communication with the dispensing chute for extruding a food product stored in the deformable container therethrough.

Means are also provided for moving the piston between the rear position and the front position and for actuating the moving means.

A second aspect of the invention comprises a system for preparing and dispensing a soft-serve food product. The system comprises, in addition to the dispenser as described above, a tempering freezer having an interior space dimensioned for admitting the deformable container containing a food product in a hard-frozen condition. The tempering freezer comprises means for raising a temperature of the food product from the hard-frozen condition to a condition for soft-serve dispensing.

A third aspect of the invention includes a deformable container that is fillable with the confection mixture in a flowable state, transportable in a frozen state, and from which single servings are dispensable upon tempering.

A fourth aspect of the invention includes an apparatus for packaging a soft-serve confection into a multiple-serving-size container for transport. The apparatus comprises means for blending a plurality of ingredients together to form a blended confection product and means for transferring the blended confection product into a deformable container having an opening. The apparatus additionally comprises means for placing the deformable container filled with the blended confection product into a substantially rigid mold and means for freezing the filled deformable container to a hardened state.

A fifth aspect of the invention includes a method of doing business, in particular, a method of distributing and selling a soft-serve food product. The method comprises the steps of packaging a product in a flowable state into a multiple-serving-sized container and freezing the product to a temperature sufficient to cause the product to harden. Additional steps include delivering the hardened product to a point of dispensing, tempering the hardened product to a temperature for soft-serve dispensing, and dispensing a single serving of the product to a consumer.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1-8.

Figure 2:
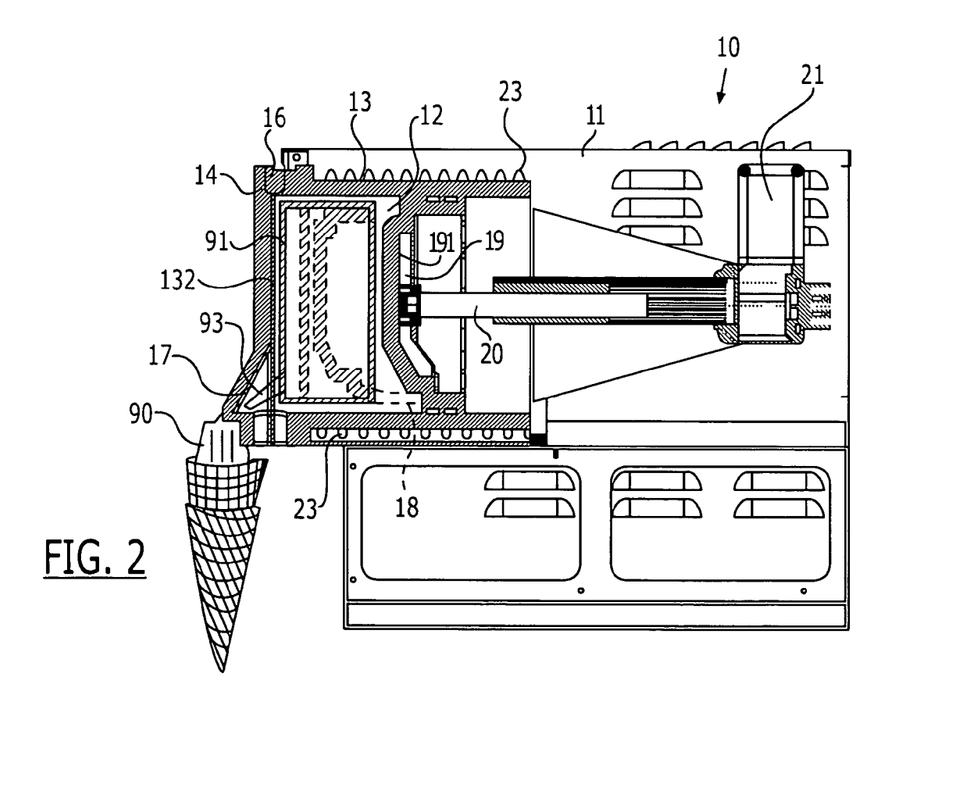
FIG. 2 is a cross-sectional view of the dispenser of FIG. 1 along the line 2-2.
Figure 3:
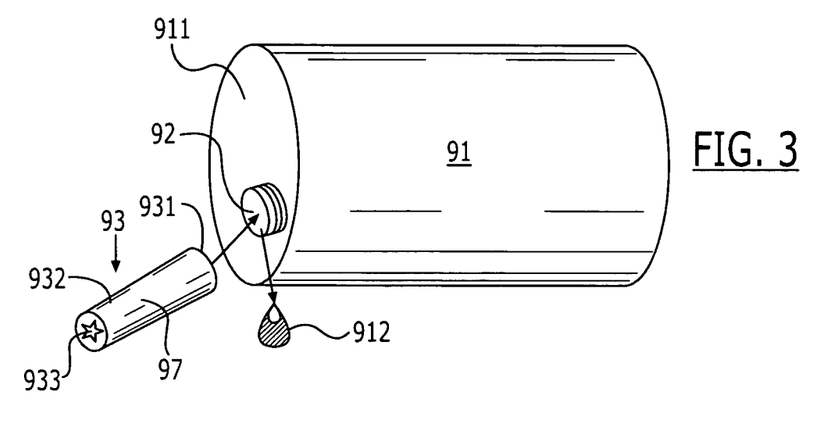
FIG. 3 is a front perspective view of the fillable bag.
Figure 4:
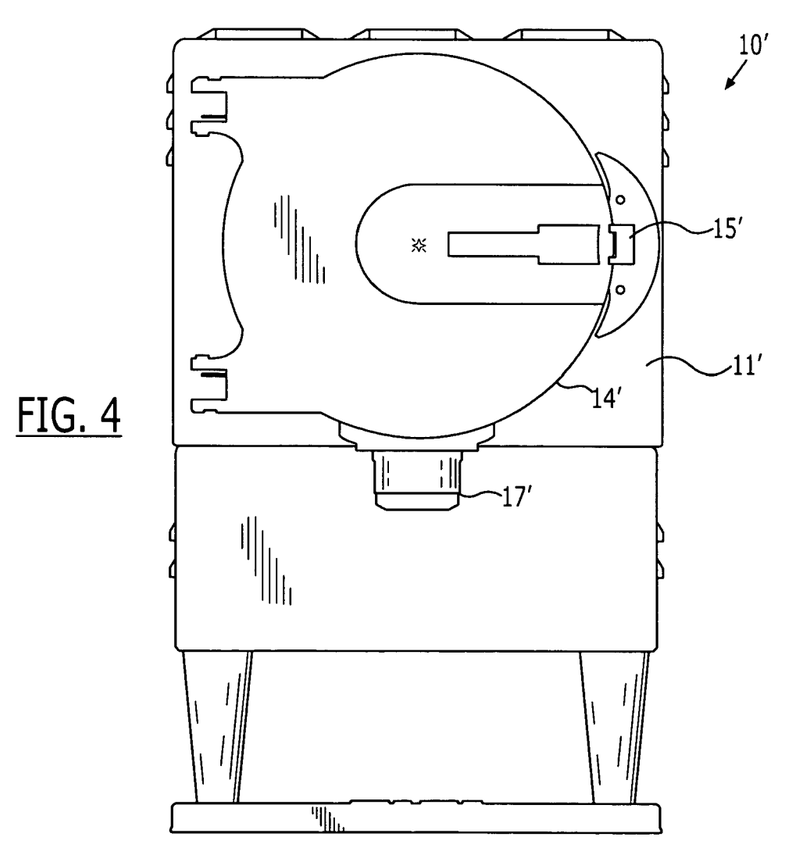
FIG. 4 is a front view of a second embodiment of the dispenser.
Figure 5:
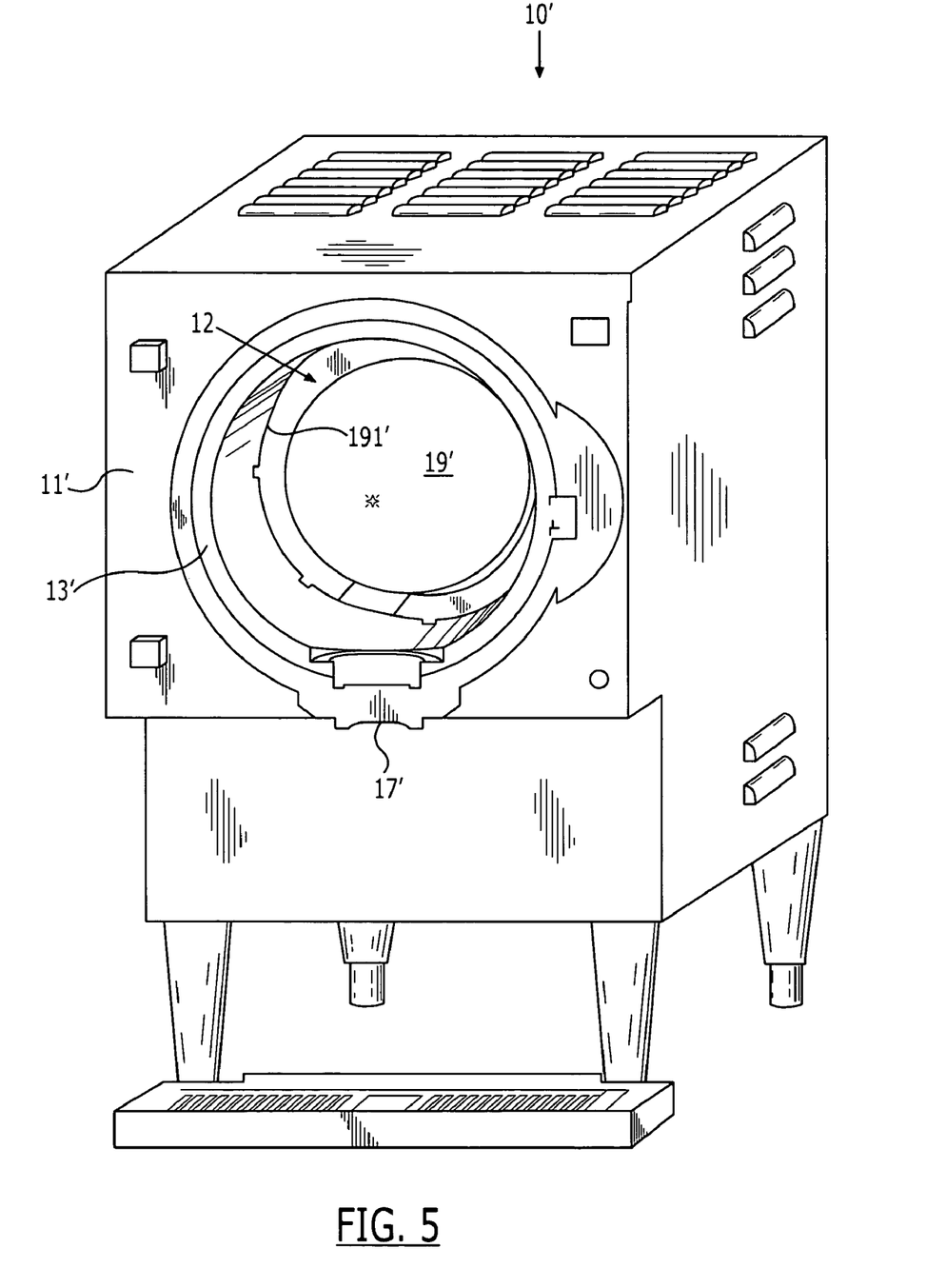
FIG. 5 is a front view of the embodiment of FIG. 4 with the door removed.
Figure 6:
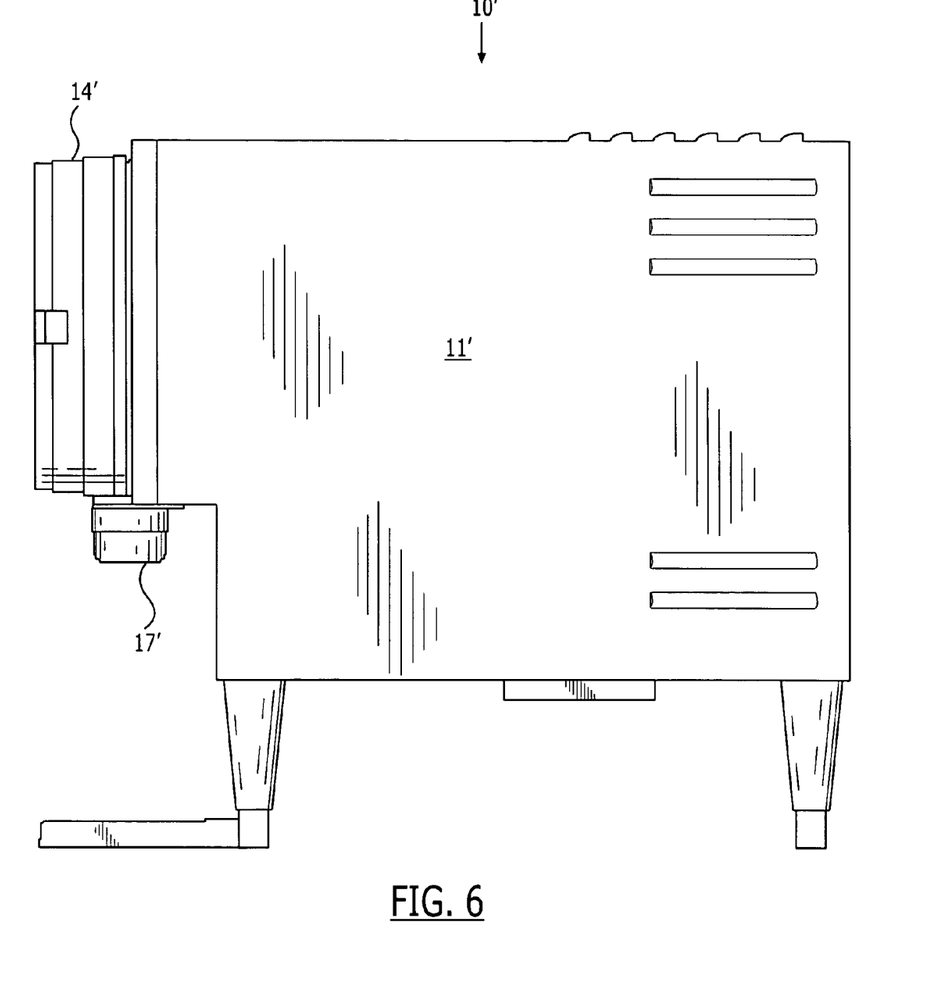
FIG. 6 is a side view of the embodiment of FIG. 4.

The first embodiment of the invention is a dispenser 10 (FIGS. 1 and 2) for a soft-serve product 90 stored in a multiple-serving-size deformable container 91, which has a sealable opening 92 engageable with a dispensing spout 93 (FIG. 3). In an embodiment believed to represent the best mode at the time of filing, the deformable container 91 comprises a generally cylindrical, flexible plastic bag having a capacity of 2.5 gallons. Positioned in a front face 911 of the deformable container 91 is the 2-inch opening 92, which is sealed with a foil pull-tab 912.

Figure 1:
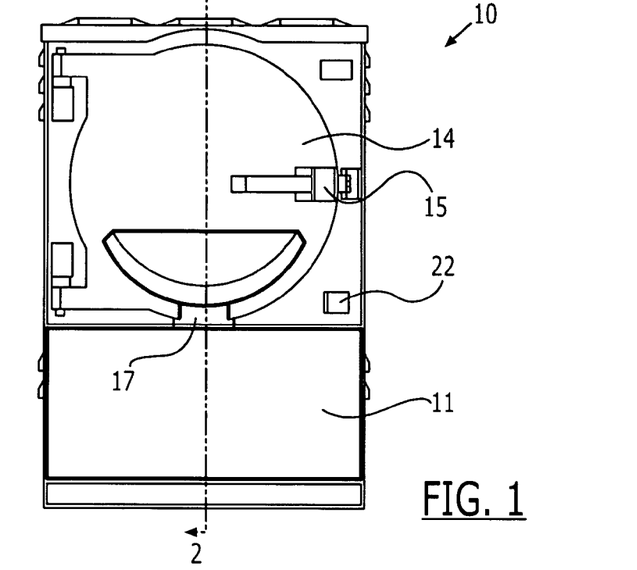
FIG. 1 is a front view of a first embodiment of the dispenser of the present invention.

The dispenser comprises a housing 11 that comprises an inner lateral wall 13 having a front edge 16 defining a front opening 132. The lateral wall 13 in a preferred embodiment is generally cylindrical. A front door 14 is movably affixed to the housing 11 and is movable between an open position exposing the front opening 132 and a closed position obscuring the front opening 132. The door 14 is preferably hingedly connected to the housing 11 and further comprises a latch 15 that is engageable for retaining the door 14 in the closed position. The door 14 also comprises a dispensing chute 17 that in the first embodiment 10 protrudes from a bottom of the door 14 as an inverted lip. In a second embodiment of the dispenser 10' (FIGS. 4-7, wherein like elements from FIGS. 1 and 2 are indicated by like reference numerals primed), the dispensing chute 17' comprises a cylindrical spout extending downward from the bottom of the door 14'.

The dispenser 10 further comprises a piston 20 having a head 19 that is positioned within the housing 11. The lateral wall 13, the piston head 19, and the front door 14 in a closed position define an enclosed hollow space 12. The piston head 19 is slidable within the lateral wall 13 from a rear position wherein the hollow space 12 comprises a maximum volume dimensioned sufficiently large to receive the deformable container 91 in a filled state to a front position wherein the space 12 comprises a minimum volume dimensioned for squeezing the deformable container 91 to a substantially empty state.

Preferably the piston head 19 has a generally circular outer edge 191 (see FIG. 5) for closely engaging the lateral wall 13.

A dispensing spout 93 having a passage 97 therethrough is engagable with the deformable container's opening 92. The spout 93 is positionable in fluid communication with the dispensing chute 17 for extruding a food product 90 stored in the deformable container 91 therethrough. In a preferred embodiment the dispensing spout 93 is engagable with the deformable container's opening 92 at a first end 931 and has an opening 933 at a second end 932 in fluid communication with the passage 97. Preferably the opening 933 is shaped for dispensing the food product 90 in a desired conformation. Most preferably, the dispensing spout's second end opening 933 has a generally star shape for dispensing a "swirl"-shaped serving of the food product, such as, but not intended to be limited to, a twisted frozen confection such as ice cream or an equivalent.

Means are provided for moving the piston 20 between the rear position and the front position and also for actuating the moving means. In a preferred embodiment the moving means comprises a motor 21 positioned within the housing 11 and connected in motion-causing engagement with the piston 20. Also in a preferred embodiment the actuating means comprises a switch 22 in actuating communication with the motor 21. It will be understood by one of skill in the art that the word "switch" can be construed to mean any equivalent actuating means known in the art such as a button. Further, the switch 22 may be of the type that is adapted to actuate the motor 21 for a predetermined time or alternatively of the type that is adapted to actuate the motor 21 when depressed and to turn off the motor 21 when released.

The dispenser 10 preferably further comprising means for retaining the enclosed hollow space 12 at a temperature for dispensing the food product 90 in a soft-serve state, such as a freezer apparatus settable to a temperature in a range of −20 to +20° F. In a preferred embodiment the retaining means comprises a refrigeration coil 23 that is positioned in surrounding relation to the lateral wall 11 and is most preferably molded into the housing 11. Preferably the temperature in the hollow space 12 should not fluctuate more than ±2° F. Most preferably the retaining means further comprises a second refrigeration coil (not shown) that is positioned in surrounding relation to the dispensing chute 17.

A second aspect of the present invention is a system 40 (FIG. 7) for preparing and dispensing a soft-serve food product 90. The system 40 comprises, in addition to the dispenser 10,10' described above, a storage freezer 45 for maintaining the food product 90 within the deformable container 91 such as described above in a hardened condition.

Figure 7:
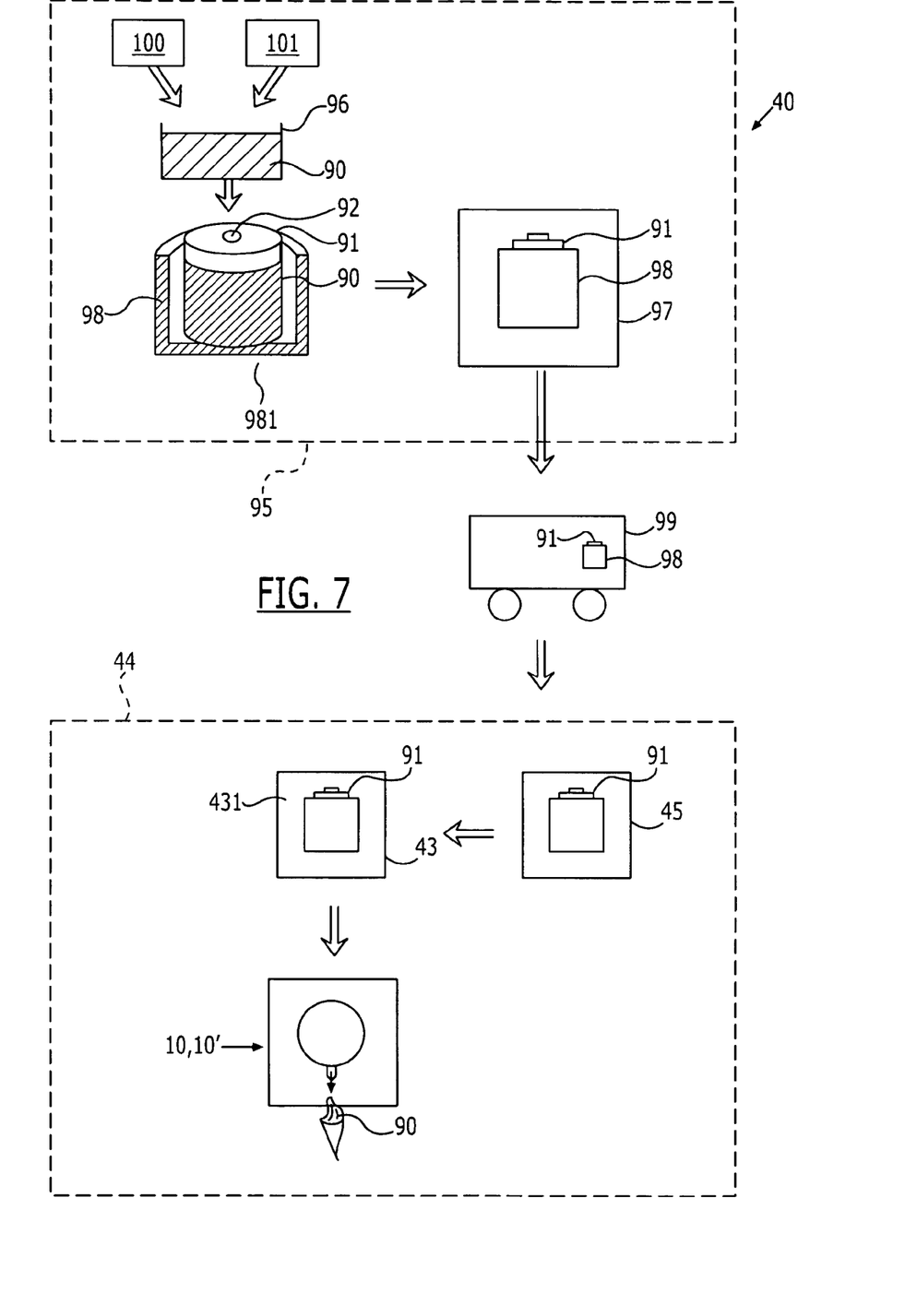
FIG. 7 is a schematic of the packaging, storage, and dispensing system of the present invention.

In addition is included a tempering freezer 43 that has an interior space 431 dimensioned for admitting the deformable container 91 containing the food product 90 in a hard-frozen condition. The tempering freezer 43 comprises means for raising a temperature of the food product from the hard-frozen condition to a condition for soft-serve dispensing. Typically these elements of the system 40 are situated at a dispensing site 44. The temperature-raising means of the tempering freezer 43 is adapted to raise a temperature of the food product 90 from a first temperature in a range of −20 to +20° F. to a second temperature in a range of 17-23° F. in a time period of approximately 10 hours. For example, for a food product 90 such as a frozen confection, the tempering freezer 43 operates to raise the temperature from approximately 0° F. to approximately 18° F.

The system 40 also includes elements at a manufacturing and packaging site 95. Such elements include means for blending together a generally homogeneous flavored base mix 100 and a particulate additive 101 in a mixing container 96 to form the food product 90, and means for filling the deformable container 91 through the opening 92 with the food product 90 in a flowable state, such as by transferring the food product 90 in a flowable state from the mixing container 96 into the deformable container 91.

Another element at the packaging site 95 includes means for freezing the filled deformable container 91 to a hardened state, such as a hardening tunnel or conventional freezer 97, at −10° F. for 4 hours, although this is not intended as a limitation. Most preferably a substantially rigid molding sleeve 98 is supplied for maintaining the deformable container 91 in a desired shape while resident in the freezer 97. The sleeve 98 comprises, for example, a corrugated sleeve having a bottom 981 that breaks with applied outward force. The deformable container 91 may be placed into the sleeve 98 at any time prior to hard-freezing, and is typically transported in the sleeve to the dispensing site 44, where it remains until the deformable container 91 is placed into the dispenser 10. The dispensing spout 93 may be added at this time as well.

The dispenser 10 is loaded by inserting the sleeve 98 holding a deformable container 91 partway into the hollow space 12, oriented so that the spout 93 is positioned to enter the dispensing chute 17 when the door 14 is closed. The deformable container 91 is then pushed toward the piston 20, causing the bottom 981 to break away and the deformable container 91 to slide alone into the hollow space 12. Then the foil tab 912 is removed.

Although this is not intended as a limitation, the food product 90 may take the form of a dairy or non-dairy frozen confection. In this embodiment a base mix is flavored to form a soft-serve ice cream product or a sorbet-type product. The additives 101 may comprise, in the case of an ice cream-type product, particulates such as chocolate chips, sprinkles, candies; in the case of a sorbet-type product, fruit pieces, botanical additives. Color-enhancing additives may also be used. The transfer temperature for an ice cream-type product is 22° F.; for a sorbet-type product, 20° F.

Another aspect of the present invention is directed to a method of doing business, specifically, a method of distributing and selling a soft-serve food product 90. This method 70 is illustrated in flowchart form in FIG. 8, and comprises the steps of blending together a substantially homogeneous base mix 100 and a particulate additive 101 to form the food product 90 (block 701). The food product 90 is packaged in a flowable state into a multiple-serving-sized container, such as a deformable container 91 (block 702), and placing the filled deformable container 91 into a molding sleeve 98 (block 703).

Figure 8:
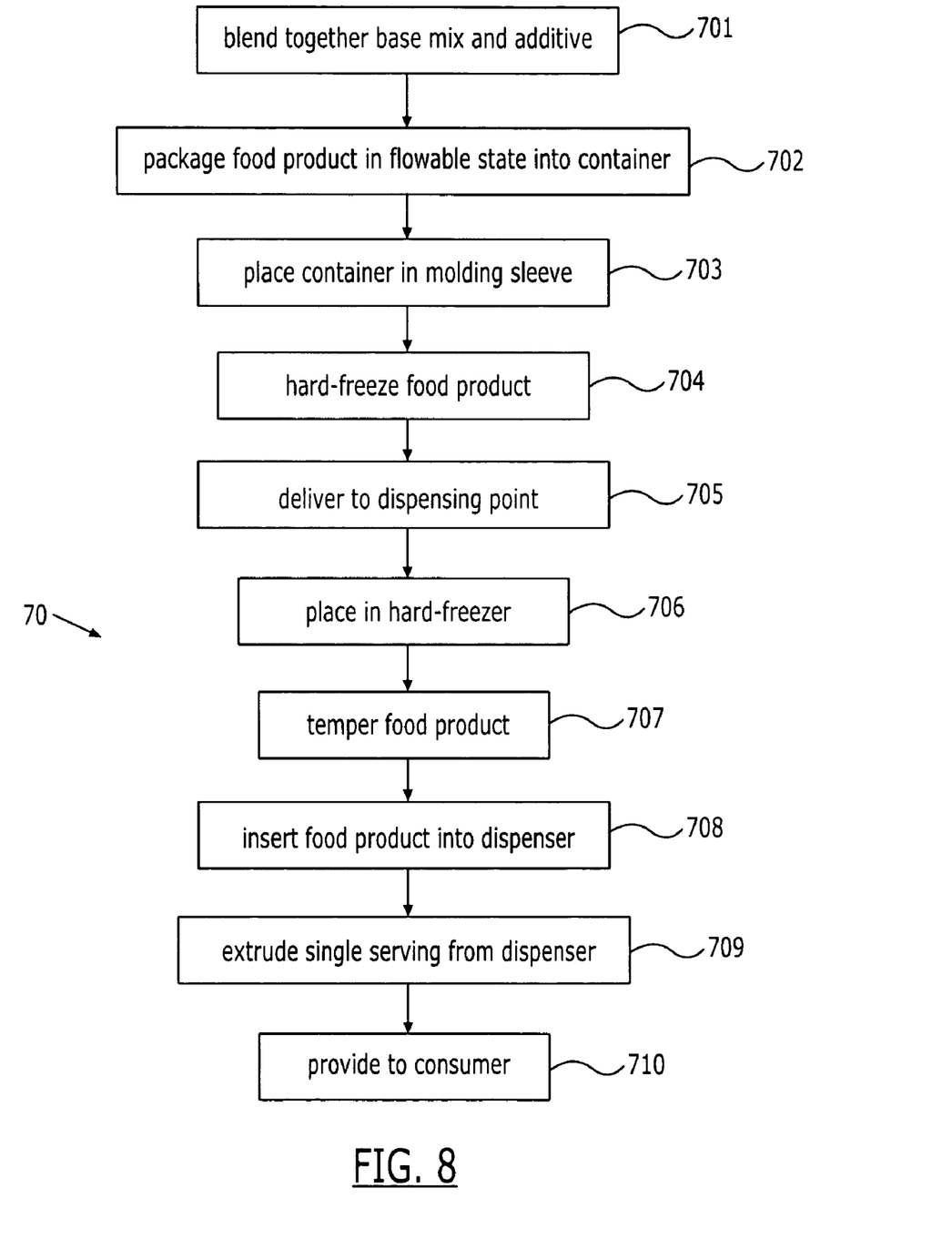
FIG. 8 is a flow chart of the business method of the present invention.

Next the food product 90 is frozen to a temperature sufficient to cause the product 90 to harden (block 704), and the hardened food product 90 is delivered to a point of dispensing 44, such as via refrigerated truck or train 99 (block 705). The delivered hardened product 90 is preferably maintained at a hard-frozen state until it is desired to dispense the product 90 in the relatively near future (block 706). The hardened food product 90 is then tempered to a temperature for soft-serve dispensing (block 707). The tempering step comprises raising the hardened food product's temperature from a first temperature in a range of −20 to +20° F. to a second temperature in a range of 17-23° F. For the specific case of a frozen confection such as ice cream or a sorbet-style product, the temperature is raised from approximately 0° F. to approximately 18° F.

The container 91 containing the tempered product 90 is inserted into a dispenser (block 708), and a single serving of the product 90 is extruded from the dispenser (block 709). Finally, a single serving of the food product 90 is served to a consumer (block 710).

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for preparing and dispensing a soft-serve food product comprising the steps of:
    blending a plurality of ingredients together to form a blended food product;
    transferring the blended food product in a flowable state into a deformable container having an opening;
    placing the deformable container filled with the blended food product into a substantially rigid molding sleeve to maintain the deformable container in a predetermined shape while freezing to a hard-frozen condition; and
    freezing the filled deformable container to the hard-frozen condition;
    raising a temperature of the deformable container from the hard-frozen condition to a condition for soft-serve dispensing;
    positioning the deformable container containing the soft-serve food product in the condition for soft-serve dispensing into an enclosed hollow space in a housing; and
    activating a piston having a head positioned within the housing to slide within the enclosed hollow space to move in a direction to squeeze the deformable container and cause the food product to be extruded from the deformable container through a dispensing spout;
    wherein the substantially rigid molding sleeve includes a bottom adapted to break away with applied outward force; and
    wherein the positioning step includes placing the substantially rigid molding sleeve at least partway into the enclosed hollow space, and pushing the deformable container toward the piston to cause the bottom to break away and slide alone into the enclosed hollow space.

2. The method recited in claim 1 wherein the temperature-raising step comprises raising a temperature of the food product from a first temperature in a range of −20 to +20° F. to a second temperature in a range of 17-23° F.

3. The method recited in claim 1 wherein the temperature-raising step comprises raising a temperature of the food product from approximately 0° F. to approximately 18° F.

* * * * *